G. F. W. HARRIS, Jr.
PLANTER.
APPLICATION FILED SEPT. 22, 1910.
985,589.
Patented Feb. 28, 1911.
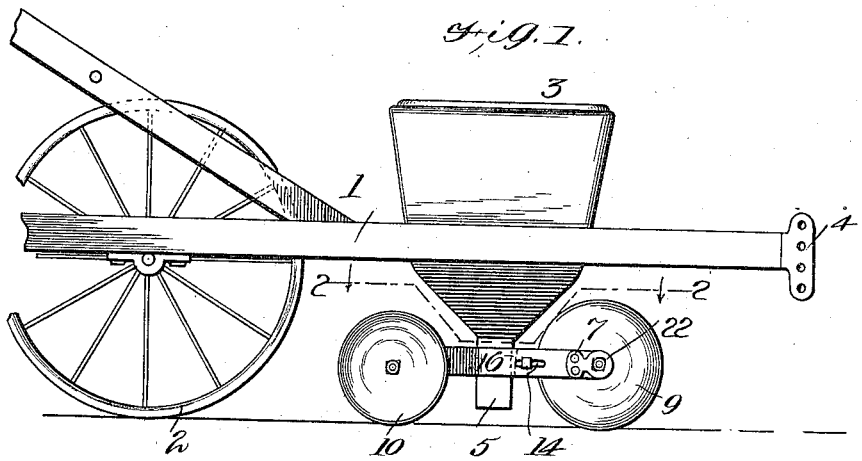
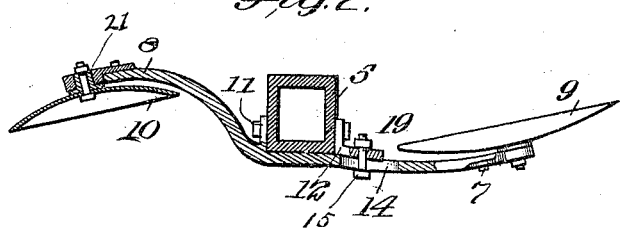
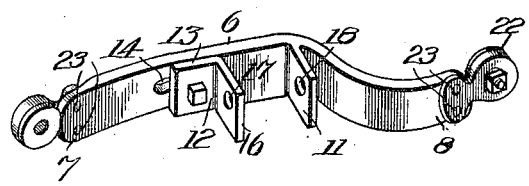
WITNESSES:
E. McCallaghan
C. E. Trainor
INVENTOR
GEORGE F. W. HARRIS Jr.
BY Munn & Co.
ATTORNEYS

UNITED STATES PATENT OFFICE.

GEORGE F. W. HARRIS, JR., OF BUNKER HILL, ILLINOIS.

PLANTER.

985,589.

Specification of Letters Patent. Patented Feb. 28, 1911.

Application filed September 22, 1910. Serial No. 583,201.

*To all whom it may concern:*

Be it known that I, GEORGE F. W. HARRIS, Jr., a citizen of the United States, and a resident of Bunker Hill, in the county of Macoupin and State of Illinois, have made certain new and useful Improvements in Planters, of which the following is a specification.

My invention is an improvement in planters, and consists in certain novel constructions and combinations of parts, hereinafter described and claimed.

The object of the invention is to provide a simple and inexpensive device, adapted for attachment to the leg of any planter, to take the place of the usual runner, and which will cut a smooth and uniform trench to receive the same and will cover the seed after it is planted.

Referring to the drawings forming a part hereof: Figure 1 is a side view of a planter provided with the improvement, Fig. 2 is a section on the line 2—2 of Fig. 1 looking in the direction of the arrows, and Fig. 3 is a perspective view of the improvement.

In the embodiment of the invention shown, the planter is of usual construction, and the frame 1 thereof is supported by the wheel 2, and is provided with the usual seed box 3 and clevis 4, for the attachment of a draft-animal.

The leg 5 of the planter to which the seed box delivers in the usual manner, is the conduit for passing the seed from the box to the furrow. Instead of the usual runner for opening a furrow, I provide a bracket consisting of a plate 6 one of whose ends 7 is bent laterally at a slight angle to the body, and the other end 8 is offset laterally in the same direction. A disk 9 is journaled on the end 7 and a second disk 10 of somewhat smaller diameter is journaled on the offset end 8. The axes of rotation of the disks are substantially parallel as shown in Fig. 2.

At the junction of the offset portion of the plate with the body portion, an integral lateral lug 11 is provided, and an angle plate 12 is connected with the body portion adjacent to the lug. One of the sides 13 of the angle plate rests against the body portion of the plate and is provided with a transverse opening, adapted to register with a slot 14 in the body portion. A bolt 15 passes through the opening and the slot, and is engaged by a nut 19. The lug 11 and the other side 16 of the angle plate are provided with openings 17 and 18 respectively, and set screws 20 pass through the openings, and engage the leg 5 of the planter to retain the plate in place.

The plate is arranged substantially horizontal and with its wide dimension vertical, the disk 9 being in front of the leg, and the disk 10 behind the same. Each disk is journaled in a boxing or bearing 21, and the bearing is held in a bracket 22 secured to the end of the plate by bolts or rivets 23.

In operation, as the planter is drawn through the field, the disk 10 cuts a furrow to receive the seed dropped through the leg, and the disk 9 covers the seed, throwing a part of the solid back into the furrow. Since, however, the disk 9 is of smaller diameter, it will not cut so deep and the furrow will be plainly marked.

I claim:

1. In a planter, the combination with the leg, of a plate having one end bent laterally at a slight angle to the body of the plate, and having the other end offset laterally in the same direction, a bracket having an opening secured to each end, a bearing in the opening of each bracket, a cutting disk journaled in each bearing, said plate having a lateral perforated lug at approximately its center, and an angle plate adjustable on the plate toward and from the lug, said plate having an opening, and set screws threaded through the opening of the lug and the opening of the angle plate for engaging the lug.

2. In a planter, the combination with the leg thereof, of a plate having one end bent laterally at a slight angle to the body of the plate and having the other end offset laterally in the same direction, the offset portion and the inclined portion being substantially parallel, a bracket having an opening secured to each end of the plate, a bearing in the opening of each bracket, said bearings being substantially parallel, a cutting disk journaled in each bearing, and means on the plate for attaching it to the leg.

3. In a planter, the combination with the leg thereof, of a plate having one end bent laterally at a slight angle to the body of the plate and having the other end offset laterally in the same direction, the offset portion and the inclined portion being substantially parallel, a cutting disk journaled on each end of the plate, the axes of rotation of the disks being substantially parallel, and means on the plate for attaching it to the leg of a planter.

GEORGE F. W. HARRIS, JR.

Witnesses:
WILLIAM E. HORINE,
GEORGE HEAL.

Copies of this patent may be obtained for five cents each, by addressing the "Commissioner of Patents, Washington, D. C."